United States Patent [19]

DeMeyer et al.

[11] Patent Number: 4,537,061
[45] Date of Patent: Aug. 27, 1985

[54] ELECTRONIC LEVEL DETECTOR

[75] Inventors: Roy W. DeMeyer, Oconomowoc, Wis.; Martin F. Kozi, Lombard, Ill.

[73] Assignee: Magnetrol International, Incorporated, Downers Grove, Ill.

[21] Appl. No.: 463,712

[22] Filed: Feb. 4, 1983

[51] Int. Cl.³ .............................................. G01F 23/00
[52] U.S. Cl. .................................. 73/290 R; 73/309; 73/308
[58] Field of Search ..................... 73/290 R, 309, 308, 73/313; 336/45, 30

[56] References Cited

U.S. PATENT DOCUMENTS

| 2,629,826 | 2/1953 | McIlvaine et al. | 73/313 |
| 2,903,678 | 9/1959 | Wills | 73/313 |
| 2,985,854 | 5/1961 | Brosh | 336/30 |
| 3,181,055 | 4/1965 | Bischof | 336/30 |
| 3,234,792 | 2/1966 | Ririe et al. | 73/309 |
| 3,245,425 | 4/1966 | De Meyer et al. | |
| 3,701,136 | 10/1972 | Stevens et al. | 336/30 |
| 4,149,133 | 4/1979 | Hilgert | 336/30 |
| 4,297,698 | 10/1981 | Pauwels et al. | 336/45 |
| 4,322,727 | 3/1982 | Zabler et al. | 336/45 |

Primary Examiner—Charles Frankfort
Assistant Examiner—David R. Schuster
Attorney, Agent, or Firm—Wood, Dalton, Phillips, Mason & Rowe

[57] ABSTRACT

A level detecting device for detecting the level of liquid in a tank includes a displacer or float displaceable in response to the level of the liquid in the tank, an enclosure tube disposed on the tank and sealed thereagainst so that the exterior of the enclosure tube is isolated from the liquid in the tank and a variable transformer for detecting the displacement of the float. The transformer includes at least two windings disposed adjacent the outside of the enclosure tube and an elongate core disposed within the enclosure tube and coupled to the float so as to be movable therewith, the amount of magnetic coupling between the windings being dependent upon the position of the core in the enclosure tube. Means are provided for generating an output signal representing the amount of magnetic coupling between the windings to derive an indication of the level of the liquid in the tank. Since the float and core are isolated from the balance of the apparatus by the enclosure tube, the liquid cannot adversely affect the components of the detector, and hence the life and reliability of the apparatus is extended.

5 Claims, 8 Drawing Figures

ELECTRONIC LEVEL DETECTOR

DESCRIPTION

BACKGROUND OF THE INVENTION

The present invention relates to level sensing apparatus, and more particularly to an electronic level detector for generating a signal or other indication of liquid level height in a process tank.

One prior system for detecting the level of liquid in a tank is shown and described in DeMeyer U.S. Pat. No. 3,245,425. This system includes a displacer which follows changes in liquid level in the tank. A magnetic armature is connected to the displacer to move therewith, within a vertical tube of nonmagnetic material secured to the top of the tank. Movements of the armature are followed by a magnet which is positioned adjacent the exterior of the tube. The magnet is secured to the end of a lever which carries an indicating dial to provide an indication of changes in liquid level. The system also effects process control of conditions within the tank by means of pneumatic control apparatus actuated by the lever.

SUMMARY OF THE INVENTION

In accordance with the present invention, there is provided a level detector for generating a signal or other indication of liquid level height in a tank.

The level detecting device of the present invention includes a displacer or float which follows the level of liquid in a tank, an enclosure tube disposed on the tank and sealed thereagainst so that components outside the enclosure tube are isolated from the liquid in the tank and a variable transformer for detecting movement of the displacer. The variable transformer includes at least two windings disposed outside of the enclosure tube in proximity thereto and an elongate core coupled to the displacer and movable within the enclosure tube in accordance with the level of liquid in the tank. The degree of magnetic coupling between the windings is dependent upon the position of the core and hence also the level of the liquid in the tank. Means are provided for generating an output signal representing the amount of magnetic coupling between the windings to derive an indication of the level of the liquid in the tank.

The output signal generating means includes means for driving a meter or other indicator to provide a direct reading of liquid level height. The driving means includes non-interactive zero and span controls for precise zeroing and adjustment of the range of the output device.

DESCRIPTION OF THE PREFERRED EMBODIMENT

Figure 1:
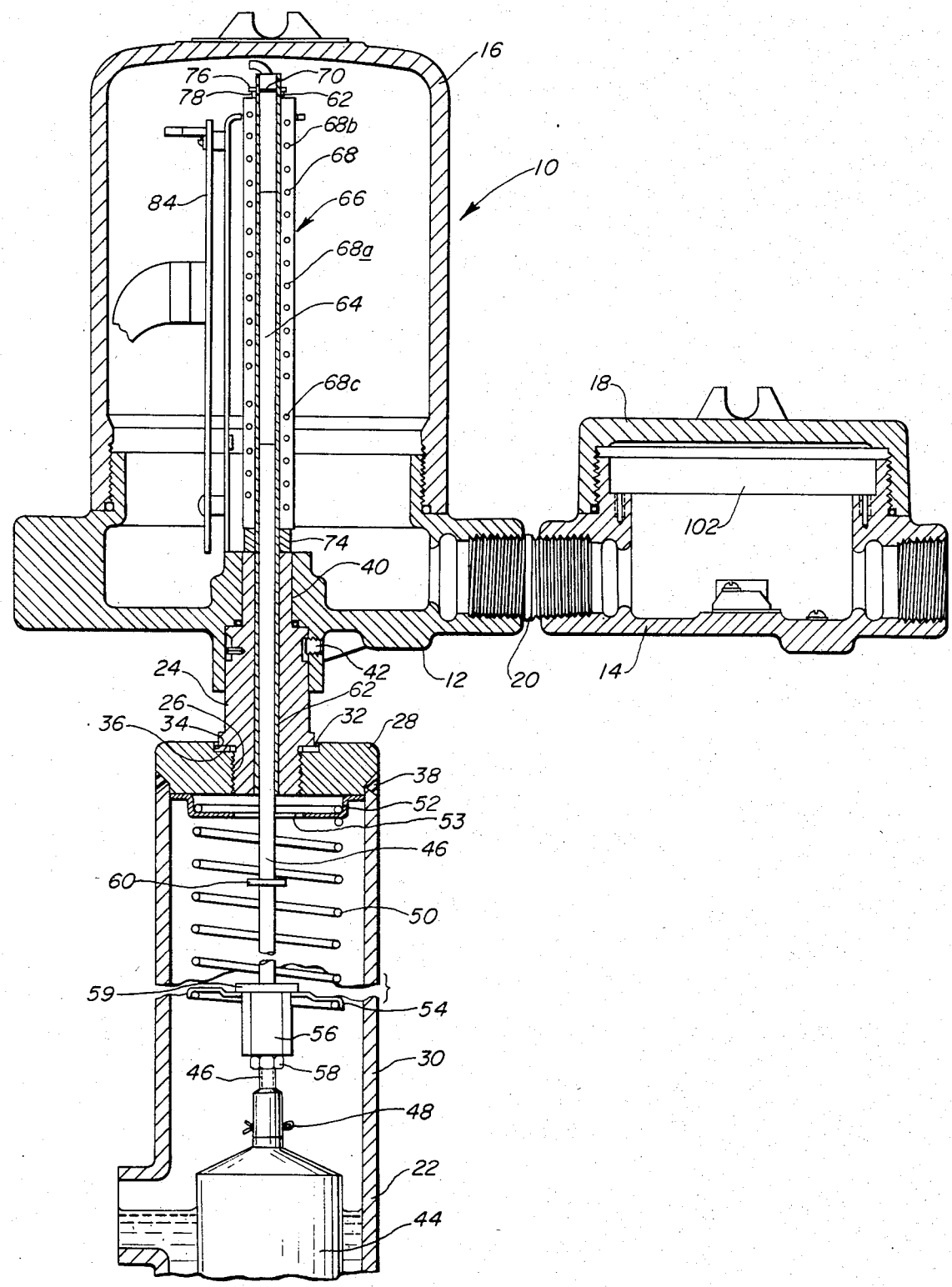
FIG. 1 is an elevational view, partly in section, of the electronic level detector of the present invention.

Referring now to FIG. 1, there is illustrated an electronic level detector 10 according to the present invention. A base 12 and a junction box 14 secured thereto are enclosed by covers 16,18, respectively. The base 12 and junction box 14 are joined by a threaded nipple 20 which is engaged in threaded bores in the base 12 and junction box 14.

The base 12 is joined to a tank, such as process tank 22 by a second nipple 24 which depends downwardly from the base 12. One end of the nipple 24 is threadably received within a bore 26 of a mounting plate 28, which is in turn secured to an extension 30 of the tank 22. A washer 32 is disposed within a counterbore 34 of the mounting plate 28 and is engaged by a shoulder 36 of the nipple 24 to isolate the interior of the process tank 22 from the exterior environment. A weld 38 is made between the mounting plate and the a surface of the extension 30 to provide additional isolation.

The other end of the nipple 24 is received within a stepped bore 40 disposed within a boss 41 extending downwardly from the base 12. The nipple 24 is retained in the stepped bore 40 by means of a set screw 42.

Disposed within the process tank 22 is a displacer or float 44 which contacts the liquid within the process tank 22 and follows the level thereof. The displacer 44 is in turn coupled to a displacer rod 46 by means of a shear pin 48 which passes through a collar of the displacer 44 and through the displacer rod 46.

The weight of the displacer 44 is opposed by a spring 50 secured between upper and lower spring plates 52,54, respectively. The upper spring plate 52 is in turn attached to a lower surface of the mounting plate 28 and includes a central bore 53 through which the displacer rod 46 passes. The lower spring plate 54 is carried on a spring plate bushing 56 secured on the displacer rod 46 by means of a nut 58 and bears against an enlarged diameter portion 59 of the bushing 56.

The spring 50 exerts a force opposing the downward force caused by the weight of the displacer 44. The displacer 44 is therefore free to move up and down in response to changes in liquid level height within the process tank 22. In order to limit upward travel of the displacer 44, a stop ring 60 is disposed on the displacer rod 46 which engages the bottom surface of the nipple 24 when the liquid level height within the tank 22 reaches a predetermined maximum.

In the preferred embodiment, the stop ring 60 is secured to a point on the displacer rod 46 such that the displacer may move vertically with a total of a 1¼ inch travel. A greater or lesser travel may be accomplished by varying the placement of the stop 60 on the displacer rod 46, if desired.

An enclosure tube 62 is welded within the nipple 24 and extends upwardly through the base 12 and into the space enclosed by the base cover 16. Disposed atop the displacer rod 46 is a cylinder of ferromagnetic material, preferably an iron/nickel alloy, which forms the core of a linear variable differential transformer (or LVDT) 66. The LVDT 66 includes a plurality of windings 68 disposed about the outer periphery of the enclosure tube 62.

The enclosure tube 62 is made of a material which will not interfere with the magnetic coupling between the windings 68 as influenced by the position of the core 64. In the preferred embodiment, the enclosure tube is fabricated from Type 316 stainless steel.

It should be noted that a variable transformer other than an LVDT may be used, the only requirements being that the transformer include a primary and at least one secondary winding and that the coupling between the two windings is determined by the position of the core therebetween. In the preferred embodiment, the LVDT includes one primary winding 68a and two secondary windings 68b, 68c disposed along the extent of the enclosure tube 62. The magnetic coupling between the primary winding 68a and the secondary windings 68b,68c is varied depending upon the position of the core 64 in the enclosure tube 62. That is, a high degree of coupling is present between the windings 68a,68b when the level of liquid is high while the degree of coupling between the windings 68a,68c is low. Conversely, when the level of liquid is low, the coupling between the windings 68a,68b is low and the coupling between the windings 68a,68c is high.

The enclosure tube 62 is sealed at its upper end by a plug 70 to isolate the interior of the process tank from the interior of the base 12 and cover 16.

The windings 68 are supported atop the nipple 24 by a spacer 74 which in the preferred embodiment is made of Teflon. The windings 68 are maintained in position by means of a grip ring 76 bearing against a spacer 78 which contacts the top of the winding 68. The outer periphery of the enclosure tube 62 and the grip ring 76 form a friction fit therebetween to prevent the windings 68 from moving vertically.

Figure 2:
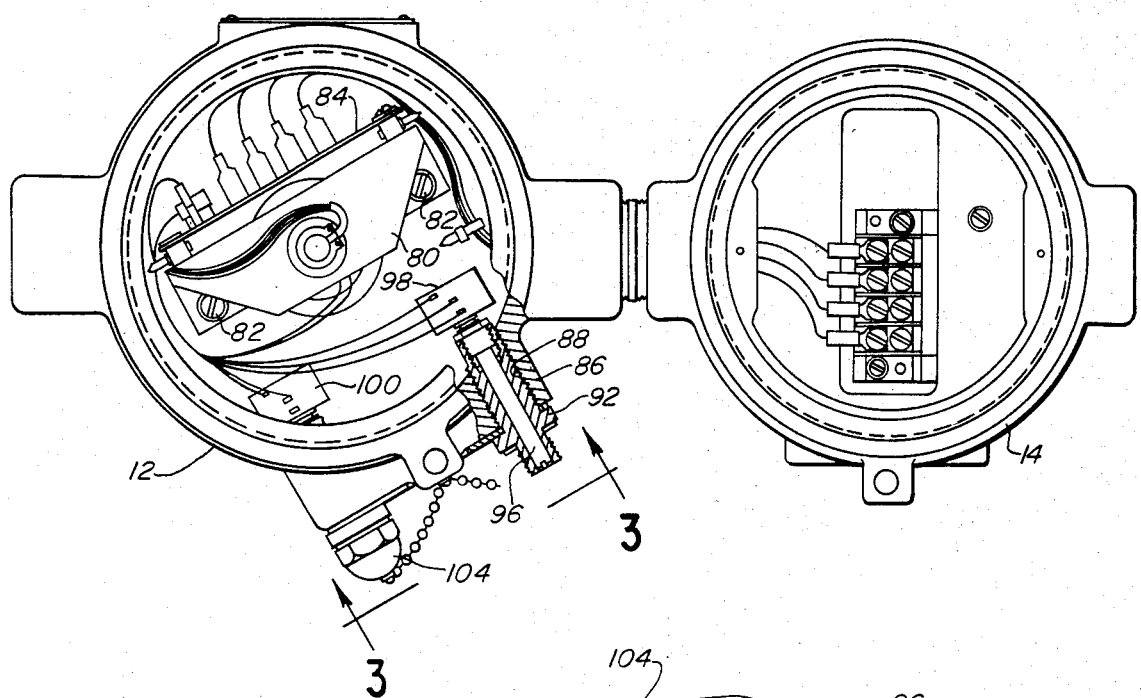
FIG. 2 is a plan view, partly in section, of the apparatus shown in FIG. 1 with the base and junction box covers removed to reveal the components therein.
Figure 3:
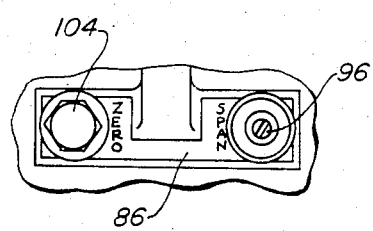
FIG. 3 is a partial elevational view taken along line 3—3 of FIG. 2.

Referring also to FIG. 2, a support bracket 80 is secured by means of screws 82 to the base 12. A PC board 84 is in turn secured to the support bracket 80 and carries the electrical components for the level detector. Power connections are made to a terminal block 85 in the junction box 14 and conductors (not shown for purposes of simplicity) transmit the power to the components on the PC board 84.

As seen specifically in FIG. 2, the base 12 also includes a boss 86 which in turn includes a threaded bore 88. A threaded collar 92 is received within the bore 88 and a rotary shaft 96 of a potentiometer 98 is journalled within the collar 92. A second potentiometer 100 is similarly disposed in a separate portion of the boss 86.

The potentiometers 98,100 are used to adjust the range and to provide zeroing of a meter 102, such as that shown in FIGS. 1 and 7, as noted more specifically below. Caps may be used to cover the ends of the shafts of the potentiometers, such as the cap 104 which is threaded onto a threaded portion of the collar 92.

Figure 4:
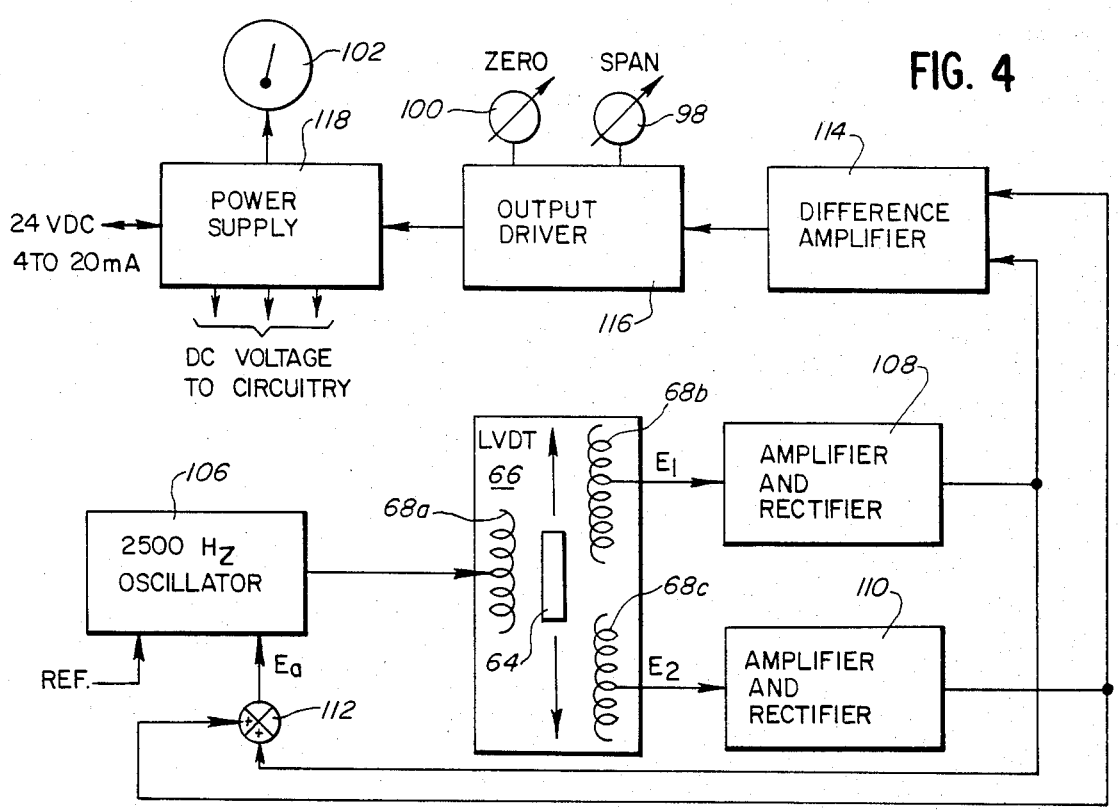
FIG. 4 is a block diagram of circuitry for the electronic level detector in FIG. 1.

Referring now to FIG. 4, there is illustrated a simplified block diagram of the circuitry for generating an output signal representing the level of liquid in the process tank 22. A sinusoidal quadrature oscillator 106 couples a 2500 hz. signal to the primary winding 68a of the LVDT 66. Output signals are developed at each of the secondary windings 68b,68c, with the amplitude of the output signals at each of the windings being a function of the sensed height of the liquid in the tank 22, as previously mentioned. These amplitudes, denoted $E_1$, $E_2$, of the signals impressed on the secondary windings 68b, 68c, respectively, may be expressed mathematically as follows:

$$E_1 = kE_a$$

$$E_2 = (1-k)E_a$$

where $E_a$ is the maximum amplitude of the output signal at one of the secondary windings 68b,68c when full coupling is present between the primary and that secondary winding and where k is a coupling coefficient which varies between zero and one and which represents the degree of coupling between the primary winding 68a and the secondary windings 68b,68c. The quantity k is a function of the position of the core and therefore a function of liquid level height in the tank 22.

The output signals from the secondary windings 68b,68c are coupled to amplifier and rectifier circuits 108,110, respectively, where these signals are amplified and converted to direct current signals.

The amplified and rectified signals from the circuits 108,110 are coupled to a summing junction 112 to generate a DC signal having an amplitude equal to $E_a$. This signal is coupled back to the oscillator 106 where it is compared with a reference voltage to generate an error signal. The error signal is used to maintain the oscillator output at a constant amplitude. This feedback arrangement compensates for temperature effects on the amplitude of the signal from the oscillator 106.

The signals from the amplifier and rectifier circuits 108,110 are also coupled to a difference amplifier 114 which generates a difference signal $E_o$ as follows:

$$E_o = E_2 - E_1 = [(1-k)E_a - kE_a]A = A(1-2k)E_a$$

where A is the amplification factor of the amplifier 114. As k varies from zero to one due to movement of the core 64, the amplitude of the difference signal $E_o$ from the amplifier 114 varies from $+AE_a$ to $-AE_a$ and is representative of the level of the liquid in the process tank 22.

Figure 7:
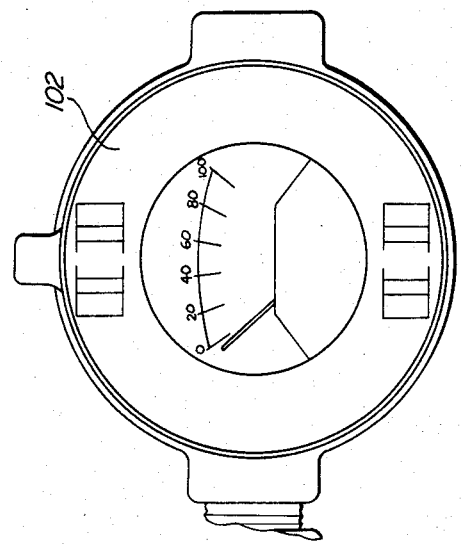
FIG. 7 shows a meter which provides an indication of liquid level in the tank.

The difference signal from the amplifier 114 is applied to an output driver circuit 116 to generate a signal to drive a suitable indicating device, such as the meter 102 shown in FIGS. 1 and 7. the output driver circuit 116 includes the potentiometers 98,100 for controlling the range or span and the zero setting of the meter 102. The signal from the circuit 116 may be coupled to the meter 102 by way of the terminal block 85 or may be transmitted to a remote location via a power supply circuit 118 to operate the indicating device. In this case the signal from the circuit 116 drains a current from power supply lines coupled to the circuit 118 that is proportional to core position. In the preferred embodiment, the output signal coupled to the power supply lines is between 4 and 20 milliamps when 24 volts DC is coupled to the power supply circuit 118. Additionally, the circuit 118 may incorporate circuitry to maintain at a constant level the DC voltage coupled to the circuit components, as noted below.

Alternatively, the power supply circuit 118 may be modified to convert a 120 volt AC input to a 24 volt DC source to drive the circuitry, in which case the output signal from the driver circuit 116 would be separately coupled to the indicating device.

Figure 5:
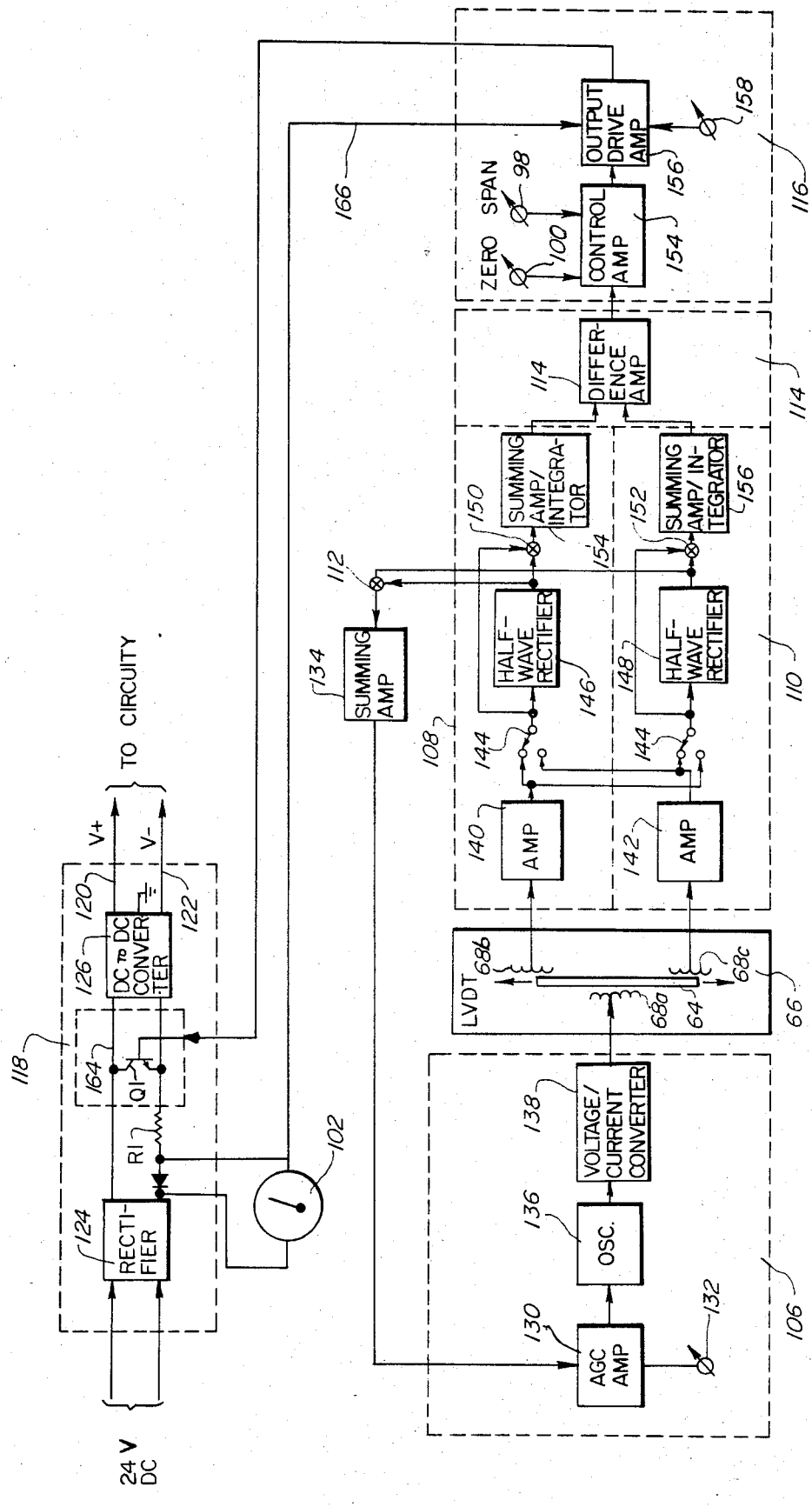
FIG. 5 is a more detailed block diagram of the circuitry shown in FIG. 4.
Figure 6A:
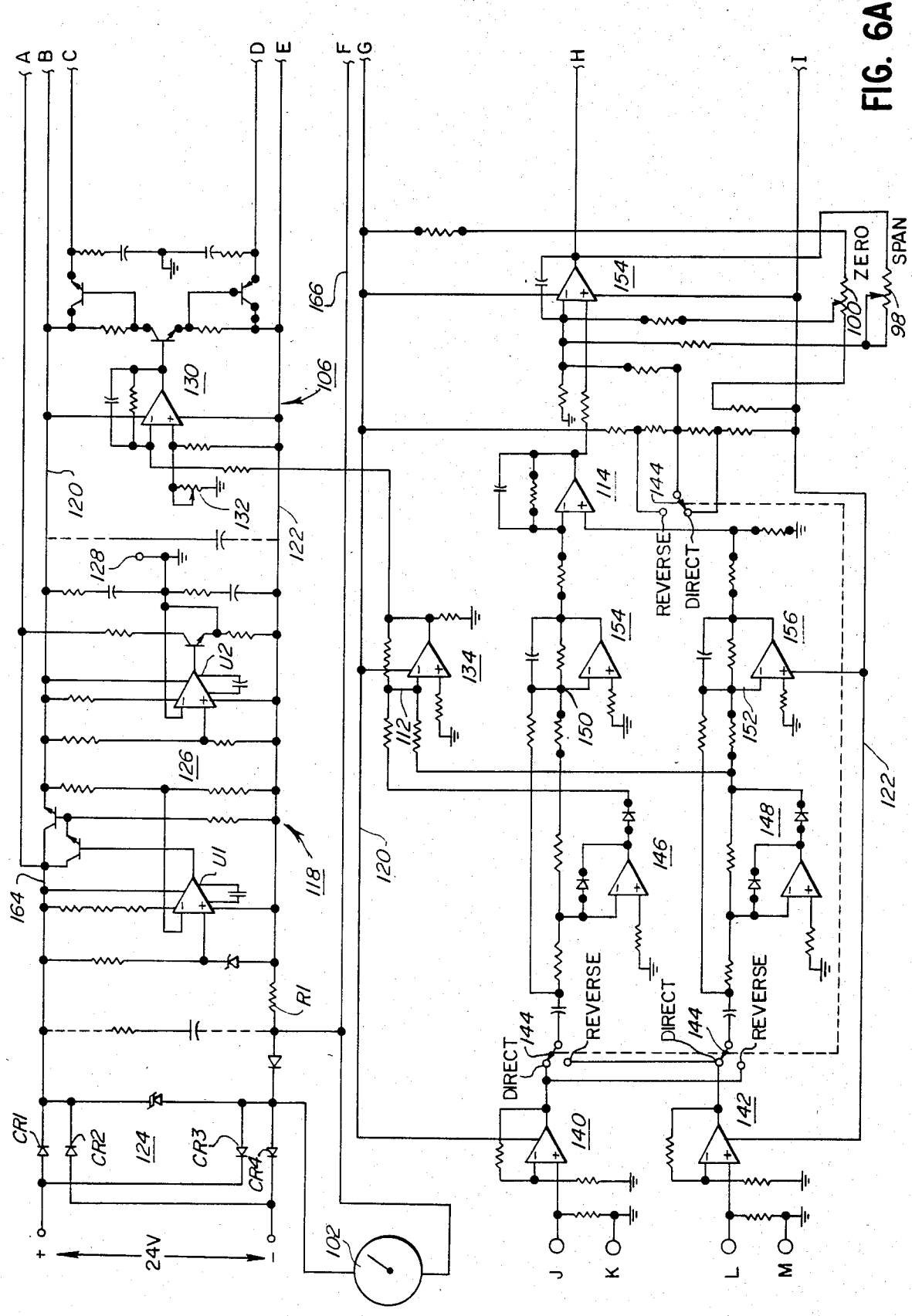
FIGS. 6a and 6b, when joined along similarly lettered lines, comprise a schematic diagram of the circuitry shown in block diagram form in FIG. 5.
Figure 6B:
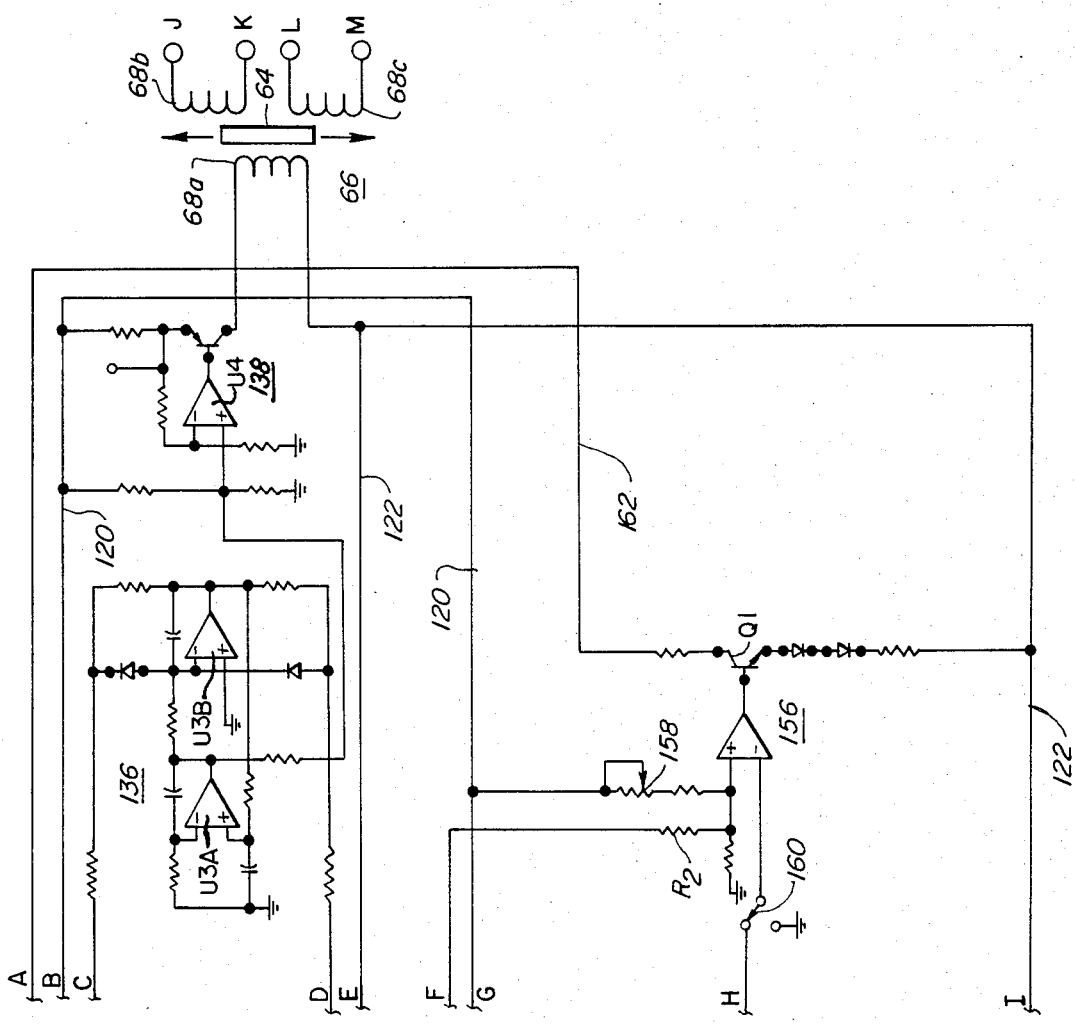

Referring to the block diagram of FIG. 5, and also the schematic diagram of FIGS. 6a and 6b, the power supply circuit 118 develops regulated voltages $V^+$ and $V^-$ on a pair of lines 120,122, respectively. These voltages are used to energize the circuit components.

The power supply circuitry 118 includes a rectifier 124 comprising diodes CR1–CR4, FIG. 6a, which protect the circuitry from damage due to the reverse application of power.

The supply voltage, which in the preferred embodiment is equal to 24 volts, is applied to a first stage of a DC-to-DC converter 126 which includes an operational amplifier U1. The amplifier U1 and associated components are isolated from the power supply by to a sampling resistor R1 and convert the input voltage to a 7.5 volt DC signal appearing across lines 120 and 122. Subsequently, a second stage of the converter 126, which includes an operational amplifier U2, divides the 7.5 volt DC signal in half, with +3.75 volts appearing between lines 120 and 128 and −3.75 volts appearing between lines 122 and 128. the amplifier U2 also generates a signal ground on a line 128 which is used as a reference potential for the balance of the circuitry. It should be noted that this reference is not at the same potential as the ground of the power supply and therefore should not be connected thereto.

The oscillator circuit 106 includes, as shown in FIGS. 5 and 6a, an automatic gain control or AGC amp 130 which receives the reference signal from a potentiometer 132 and the output from the summing junction 112 via a summing amp 134. The reference signal from the potentiometer 132 is compared with the summed signal $E_a$ to control the quadrature oscillator 106 comprised of operational amplifiers U3A and U3B. The signal from the oscillator is coupled to a voltage-to-current converter 138 which couples a signal to the primary winding 68a of the LVDT 66.

The secondary windings 68b, 68c include the same number of turns, as previously noted, however the output signals therefrom are inversely related, i.e. as the voltage impressed on one increases, the voltage on the other decreases.

The signals from the secondary windings 68b, 68c, FIG. 6b, are coupled to a pair of amplifiers 140, 142, FIGS. 5 and 6a, which isolate the LVDT from the remaining circuitry.

The amplifiers 140,142 are coupled to the contacts of a two pole switch 144 which allows the selection of either direct or reverse operation, i.e. in direct operation the output signal amplitude increases in response to rising liquid level and in the reverse operation the output signal amplitude increases in response to falling liquid level.

The signals from the contacts of the switch 144 are coupled to half-wave rectifier circuits 146, 148. The outputs from the rectifier circuits 146,148 are summed with the signals from the amplifiers 140,142 at a pair of summing junctions 150,152, respectively. The signals from the summing junctions are then amplified and integrated by circuitry 154,156 to produce a pure DC signal which is then coupled to the difference amplifier 114.

The signal from the difference amplifier is then coupled to a noninverting input of a control amplifier 154. An inverting input of the control amplifier 154 is coupled to the span and zero potentiometers 98, 100, respectively with the other end of the span potentiometer 98 being connected to the output of the amplifier 154 in a feedback configuration. The output of the control amplifier 154 is in turn coupled to an output drive amplifier 156 which develops the signal coupled to the power supply lines to generate an indication of liquid level height.

In the preferred embodiment, the span and zero potentiometers 98,100 are adjusted so that the signal from the output drive amplifier 156 varies between 4 and 20 milliamps depending upon liquid level height in the tank 22. The potentiometers 98,100 are noninteractive, i.e. the zero point will not change if the setting of the span potentiometer 98 is varied, and vice versa. The span and zero settings are adjusted by controlling the amplitude of the signal coupled to the invertng input of the output drive amplifier 156 as follows.

The output drive amplifier 156 is coupled to and controls an output transistor Q1. A control potentiometer 158 is coupled to the noninverting input of the amplifier 156. The inverting input of the amplifier 156 is coupled by a switch 160 to ground potential and the wiper of the control potentiometer 158 is adjusted until the output signal from the output transistor Q1 is equal to four milliamps. The output of the control amplifier 154 is then coupled to the inverting input of the drive amplifier 156 by the switch 160. The process tank is then emptied so that the displacer 44 is at the bottom of its travel and the wiper of the potentiometer 100 is adjusted so that the output of the control amplifier 154 is at ground potential, thereby causing the output transistor Q1 to develop a four milliamp signal. The process tank is then filled and the wiper of the potentiometer 98 is adjusted so that the output transistor generates a 20 milliamp signal.

It should be noted that the choice of limits of four and 20 milliamps to represent the low and high levels of liquid in the process tank 22 are arbitrary and may be varied, if desired, by adjusting the wipers of the potentiometers 98,100.

The signal from the output transistor Q1 is coupled over a line 162 to a line 164, which is in turn connected to the 24 volt DC input through the diodes CR1–CR4. The signal may then be applied to the meter 102, shown in FIG. 7, after first subtracting out the 24 volt bias signal. Alternatively, this signal may be directly applied to other indicating devices.

Feedback information is obtained from the resistor R1, coupled by a line 166 and a resistor R2 to the noninverting input of the amplifier 156. The drive amplifier 156 compares the input from the control amplifier with the voltage across the resistor R1 and controls the output transistor Q1 in accordance with the comparison by adjusting the bias on the transistor Q1. This approach adds the current drawn by the DC-to-DC converter into the feedback path as well as the output current, thereby correcting for any changes in the current drain of the circuit. The voltage delivered to the electrical components is therefore maintained at a predetermined level.

We claim:

1. In a level detector having a movable displacer for following the level of liquid in a tank, a displacer rod coupled to and movable with the displacer and an enclosure tube coupled to the tank for enclosing the displacer rod, the improvement comprising:

a linear variable differential transformer having
a primary winding and two secondary windings disposed about the outside of the displacer rod, and
a ferromagnetic core disposed atop the displacer rod inside the enclosure tube such that the displacer rod moves in response to movement of the displacer with the magnetic coupling between the primary and secondary windings being a function of the position of the core, wherein one of the secondary windings develops a first signal having an amplitude $E_1$ and the other of the secondary windings develops a second signal having an amplitude $E_2$ wherein $E_1 = kE_a$ $E_2 = (1-k)E_a$ where $E_a$ is the maximum amplitude of the signal from one of the secondary windings when full coupling is present between the primary winding and that secondary winding and wherein k is a coupling coefficient representing the degree of magnetic coupling between the primary and the secondary windings; and means for developing an indication of the magnetic coupling between the primary and the secondary coils, and hence the level of the liquid in the tank, wherein the indication developing means includes an oscillator coupled to the primary winding for developing an alternating current signal therein, means for rectifying the first and second signals to develop DC signals having amplitudes proportional to $E_1$ and $E_2$, respectively, and a difference amplifier for subtracting $E_1$ from $E_2$ to generate a difference signal representative of the level of the liquid in the tank.

2. The improvement of claim 1, wherein the indication developing means further includes a meter and an output driver for converting the difference signal into an output signal to drive the meter.

3. The improvement of claim 2, wherein the output driver includes means for non-interactive adjusting the zero setting and the range of the meter.

4. In a circuit for developing a signal representing the position of a core of a linear variable differential transformer having a primary winding coupled to an oscillator and first and second secondary windings, the improvement comprising:

means for sensing first and second AC signals from the first and second windings, respectively;

means for changing the first and second AC signals into first and second DC signals;

means for combining the first and second DC signals to obtain a signal representing the position of the core;

an indicating device;

means coupled to the combining means for energizing the indicating device including means for adjusting the signal from the combining means to adjust the zero setting and range of the indicating device, wherein the signal adjusting means includes first and second potentiometers for noninteractively adjusting the zero setting, and range, respectively; and a drive amplifier having a noninverting input coupled to the combining means and an inverting input connected to the first potentiometer.

5. In a circuit for developing a signal representing the position of a core of a linear variable differential transformer having a primary winding coupled to an oscillator and first and second secondary windings, the improvement comprising:

means for sensing first and second AC signals from the first and second windings, respectively;

means for changing the first and second AC signals into first and second DC signals;

means for combining the first and second DC signals to obtain a signal representing the position of the core;

an indicating device;

means coupled to the combining means for energizing the indicating device including means for adjusting the signal from the combining means to adjust the zero setting and range of the indicating device, wherein the signal adjusting means includes first and second potentiometers for noninteractively adjusting the zero setting and range, respectively; and a drive amplifier having a noninverting input coupled to the combining means, an inverting input and an output with the second potentiometer being connected between the output and the inverting input.

* * * * *